(12) United States Patent
Yahagi

(10) Patent No.: US 8,441,524 B2
(45) Date of Patent: May 14, 2013

(54) THREE-DIMENSIONAL DISPLAY DEVICE AND DIGITAL ZOOM CORRECTION METHOD

(75) Inventor: Koichi Yahagi, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 435 days.

(21) Appl. No.: 12/768,395

(22) Filed: Apr. 27, 2010

(65) Prior Publication Data

US 2010/0201789 A1      Aug. 12, 2010

(30) Foreign Application Priority Data

Jan. 5, 2009   (JP) .................................. 2009-111710

(51) Int. Cl.
*H04N 13/04*     (2006.01)
*H04N 9/74*      (2006.01)

(52) U.S. Cl.
USPC  348/51; 348/581; 348/E09.055; 348/E13.075

(58) Field of Classification Search ...................... 348/51
See application file for complete search history.

(56) References Cited

U.S. PATENT DOCUMENTS

| | | | |
|---|---|---|---|
| 6,747,757 B1 * | 6/2004 | Enomoto | 358/1.9 |
| 2002/0141635 A1 * | 10/2002 | Swift et al. | 382/154 |
| 2005/0089212 A1 * | 4/2005 | Mashitani et al. | 382/154 |
| 2007/1065103 | 7/2007 | Arima et al. | |
| 2009/0207238 A1 * | 8/2009 | Kim et al. | 348/51 |

FOREIGN PATENT DOCUMENTS

| | | |
|---|---|---|
| JP | 08-223609 A | 8/1996 |
| JP | 8317429 A | 11/1996 |
| JP | 2001-128195 A | 5/2001 |
| JP | 2007189503 A | 7/2007 |

OTHER PUBLICATIONS

Japanese Office Action for Application Ser. No. 2009-111710; issued Nov. 27, 2012 (with partial English translation).

* cited by examiner

*Primary Examiner* — Mehrdad Dastouri
*Assistant Examiner* — Nguyen Truong
(74) *Attorney, Agent, or Firm* — Sughrue Mion, PLLC

(57) ABSTRACT

A digital zoom rate of two-dimensional images zoomed by a digital zoom unit is obtained. When the obtained digital zoom rate is larger than 100%, at least one of the digitally zoomed two-dimensional images is modified based on an enlarged amount of parallax to provide an amount of parallax between the digitally zoomed two-dimensional images equal to the enlarged amount of parallax. The enlarged amount of parallax is obtained by enlarging, at a moderated digital zoom rate, an amount of parallax between the two-dimensional images before being digitally zoomed, and the moderated digital zoom rate is obtained by moderating the digital zoom rate at a moderation rate, where the moderation rate increases as the zoom rate increases. Then, a display unit is caused to carry out three-dimensional display based on the modified two-dimensional images.

6 Claims, 13 Drawing Sheets

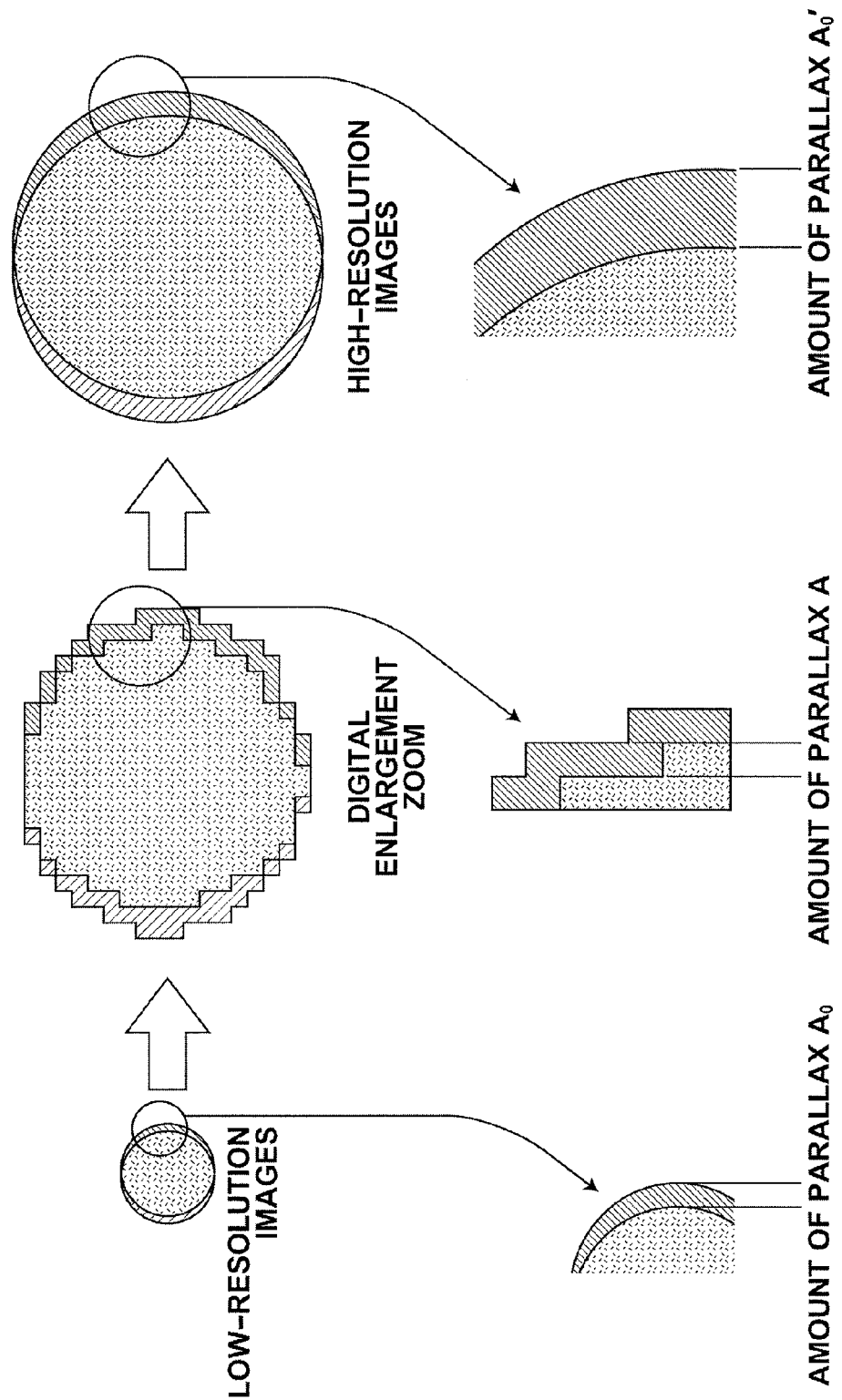

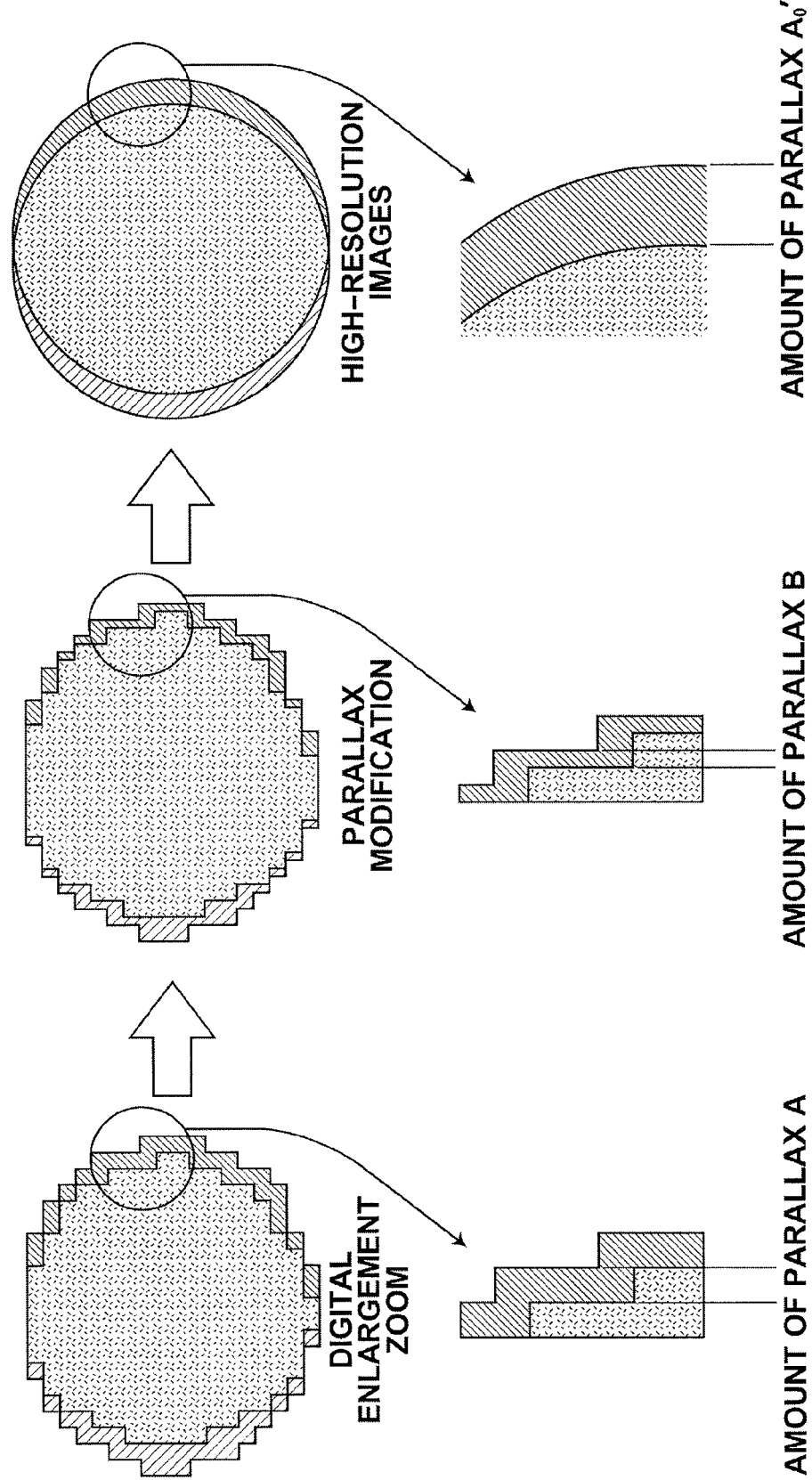

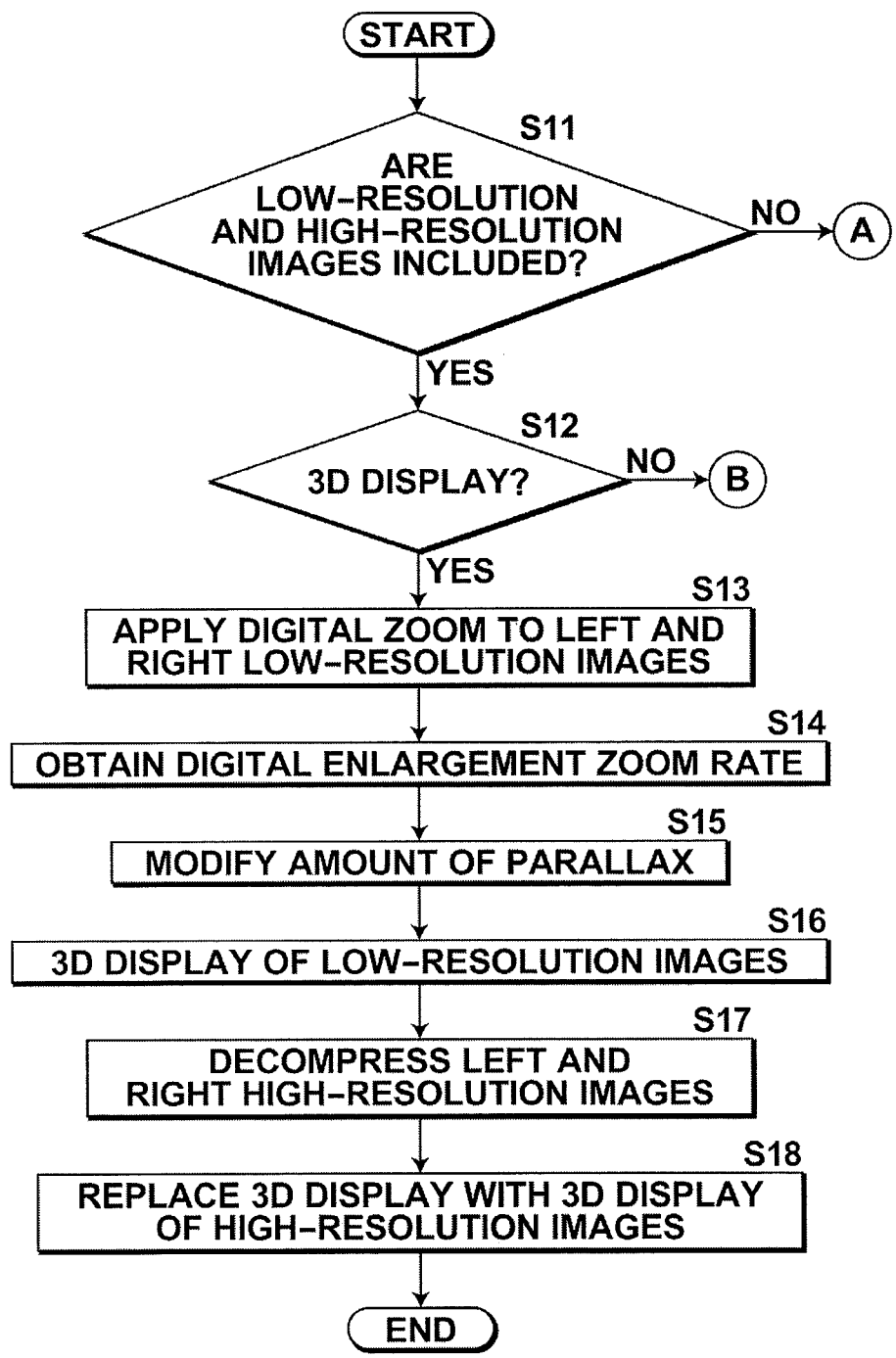

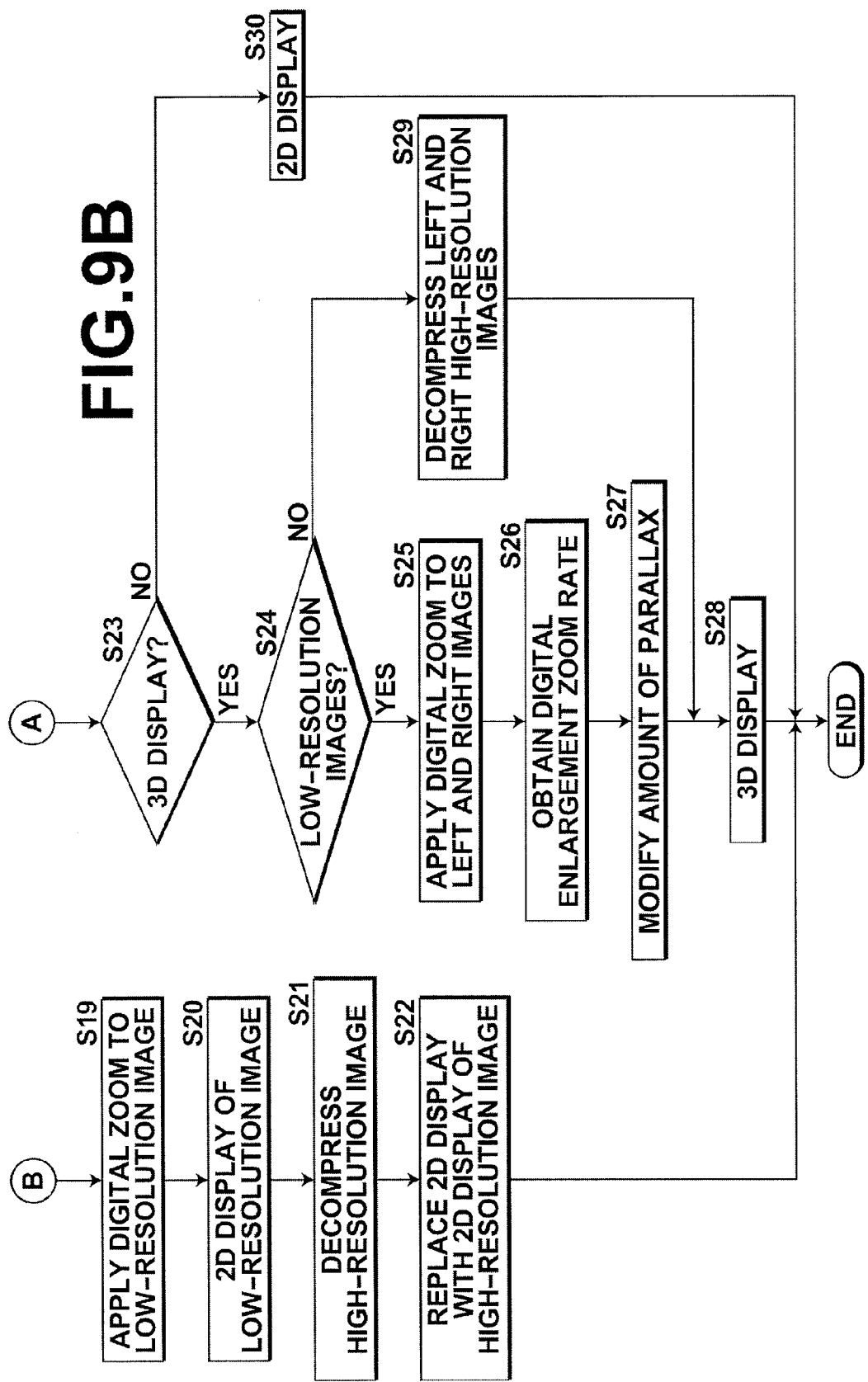

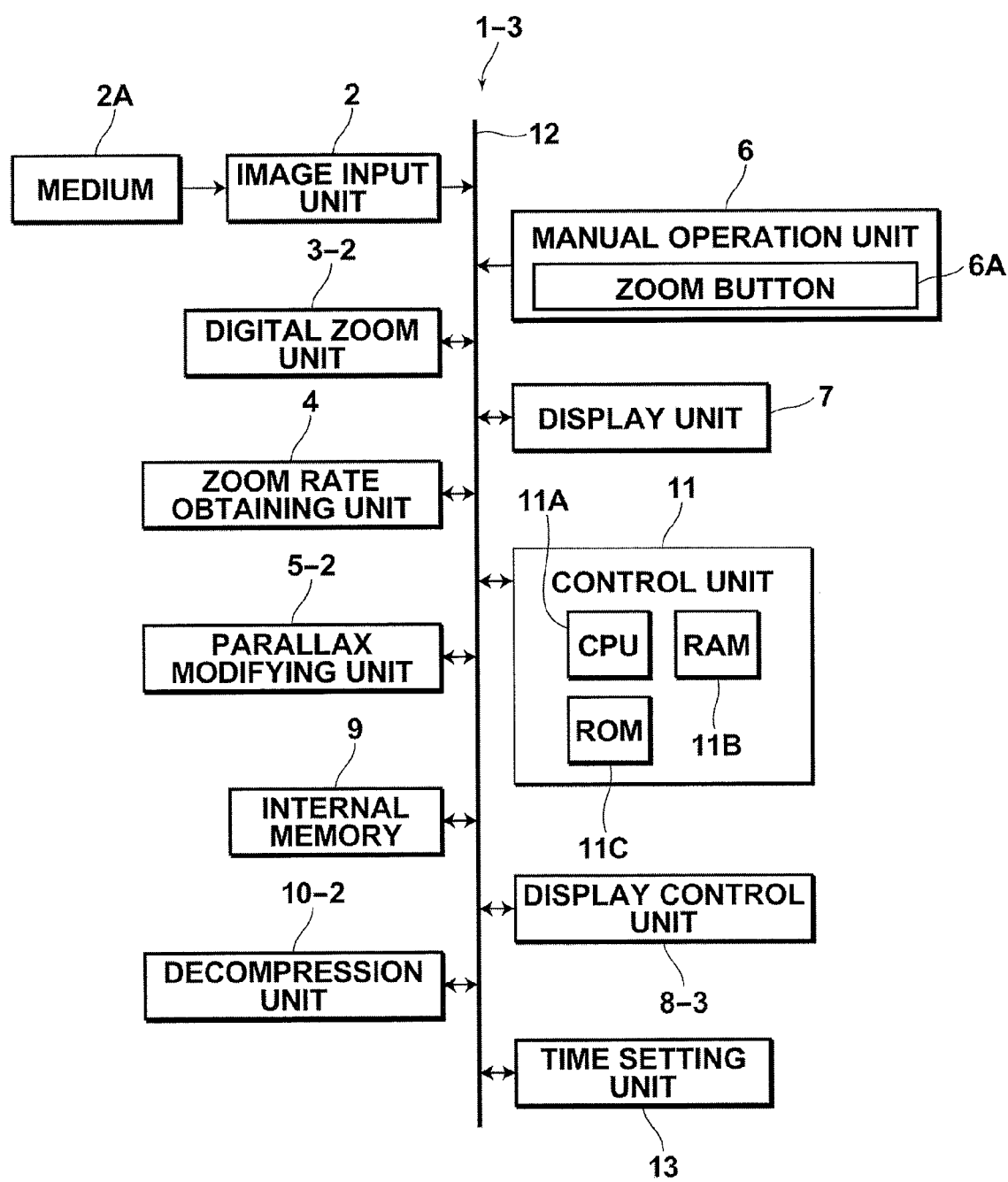

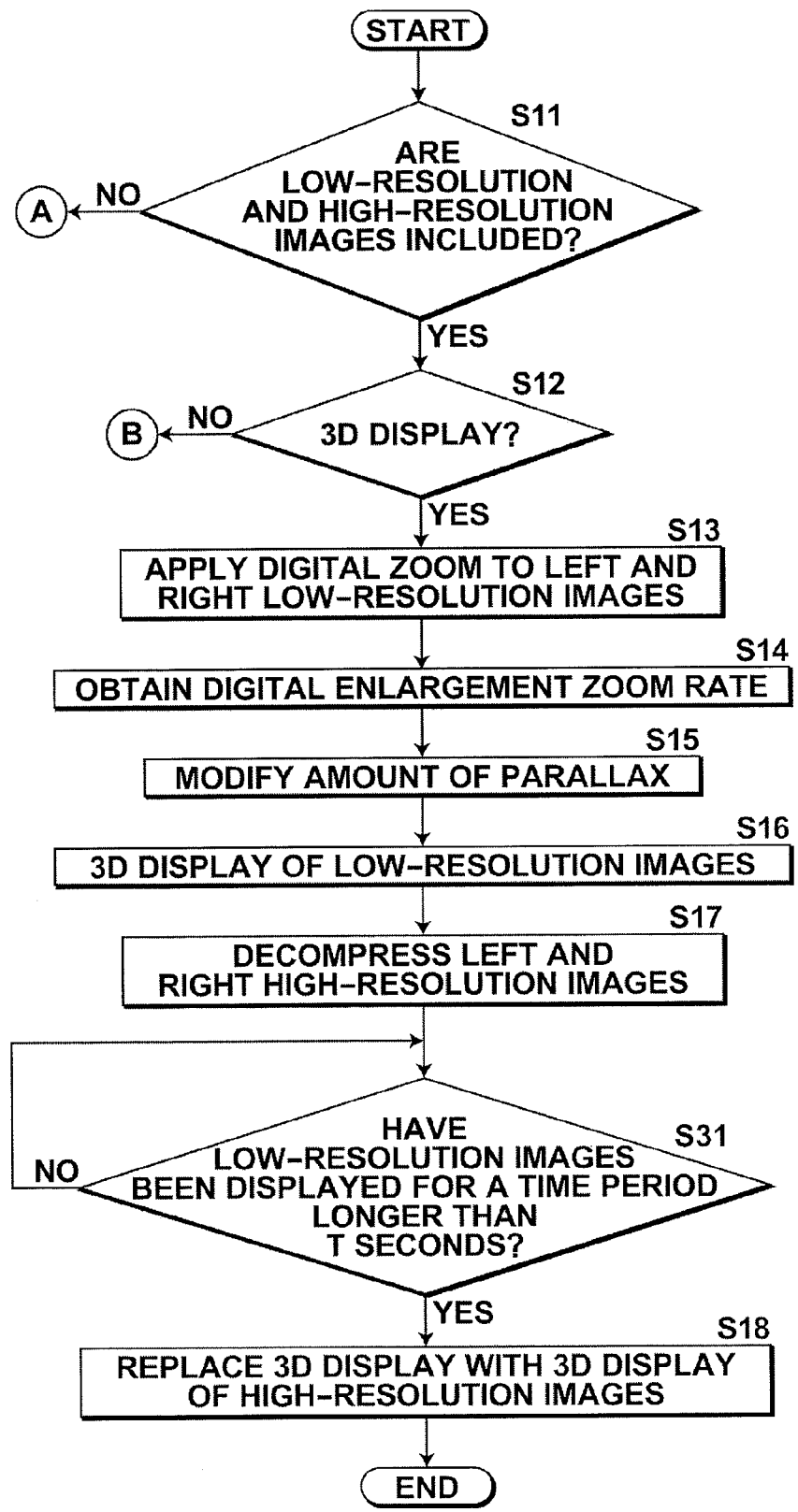

THREE-DIMENSIONAL DISPLAY DEVICE AND DIGITAL ZOOM CORRECTION METHOD

BACKGROUND OF THE INVENTION

1. Field of the Invention

The present invention relates to a three-dimensional display device which allows stereoscopic viewing and a digital zoom correction method to be carried out in the three-dimensional display device.

2. Description of the Related Art

It has been known to three-dimensionally display a combination of two or more images to provide stereoscopic viewing by using parallax between the images. Such stereoscopic viewing can be achieved by taking two or more images of the same subject with parallax therebetween (which are hereinafter referred to as parallax images) using two or more cameras placed at different positions, and three-dimensionally displaying the parallax images by using parallax between the subject images contained in the parallax images.

Specifically, a stereoscopic image can be generated by combining the two or more images by overlapping the images with providing different colors to the images, such as red and blue, respectively, or by overlapping the images with providing different polarization directions to the images. In these cases, the stereoscopic viewing can be achieved through the use of image separating glasses, such as red-and-blue glasses or polarization glasses, to view the stereoscopic image being displayed and obtain a merged view of the stereoscopic image, which is attained via the automatic focusing function of the eyes (anaglyph system, polarization filter system).

The stereoscopic viewing can also be achieved without using the polarization glasses, etc., by displaying images on a 3D liquid crystal display monitor which allows the stereoscopic viewing, such as of a parallax barrier system or a lenticular system. In this case, a stereoscopic image is generated by alternately arranging vertical strips of the two or more images. Also, the stereoscopic viewing can be achieved by alternately displaying left and right images with changing directions of light beams from the left and right images, which are viewed through the use of the image separation glasses or via an optical element attached on a liquid crystal display monitor (time division system).

With a display device which is capable of digital zoom, an enlarged image can be displayed by enlarging the original image through digital zoom, although the image quality is degraded. With the three-dimensional display device which allows stereoscopic viewing, as described above, when digital zoom is applied to a three-dimensionally displayed image, each of the two-dimensional parallax images is digitally zoomed. Therefore, parallax errors may be introduced among portions of the parallax images being displayed, and this may result in a distorted three-dimensional image or an insufficient or excessive stereoscopic effect during three-dimensional display of the parallax images, and may cause feeling of fatigue and/or discomfort of the user conducting stereoscopic viewing.

In order not to cause the feeling of fatigue and/or discomfort of the user conducting stereoscopic viewing, some methods have been proposed, such as a three-dimensional display method in which a line of sight of the user conducting stereoscopic viewing is detected, and a display surface is always shifted to a position viewed by the user, thereby achieving display of the stereoscopic image which imposes less feeling of fatigue due to inconsistency between convergence and focusing of the eyes (Japanese Unexamined Patent Publication No. 8(1996)-223609), and a method for suppressing distortion of a stereoscopic image by correcting at least one of the parallax images based on determination of a parallax pattern among predetermined parallax patterns (Japanese Unexamined Patent Publication No. 2001-128195).

The methods disclosed in the above-mentioned patent documents, however, do not mention user's feeling of fatigue and/or discomfort when the user conducting stereoscopic viewing is viewing a three-dimensionally displayed image which is digitally zoomed.

SUMMARY OF THE INVENTION

In view of the above-described circumstances, the present invention is directed to providing a three-dimensional display device and a digital zoom correction method, which can mitigate feeling of fatigue and/or discomfort of a user conducting stereoscopic viewing when the user view a three-dimensionally displayed image which is digitally zoomed.

An aspect of the three-dimensional display device of the invention includes: display means for carrying out three-dimensional display based on two or more two-dimensional images having parallax therebetween;

digital zoom means for digitally zooming the two-dimensional images;

zoom rate obtaining means for obtaining a digital zoom rate of the two-dimensional images zoomed by the digital zoom means;

parallax modifying means for modifying at least one of the digitally zoomed two-dimensional images based on an enlarged amount of parallax to provide an amount of parallax between the digitally zoomed two-dimensional images equal to the enlarged amount of parallax when the digital zoom rate obtained by the zoom rate obtaining means is larger than 100%, wherein the enlarged amount of parallax is obtained by enlarging, at a moderated digital zoom rate, an amount of parallax between the two-dimensional images before being digitally zoomed, the moderated digital zoom rate is obtained by moderating the digital zoom rate at a moderation rate, and the moderation rate increases as the zoom rate increases; and display control means for causing the display means to carry out three-dimensional display based on the modified two-dimensional images.

In the three-dimensional display device of the invention, each of the two-dimensional images may include a low-resolution image and a compressed high-resolution image, the digital zoom means may digitally zoom the low-resolution images, the parallax modifying means may apply the modification to at least one of the digitally zoomed low-resolution images, the three-dimensional display device may further include decompressing means for decompressing the compressed high-resolution image, and the display control means may cause the display means to carry out first three-dimensional display based on the modified low-resolution images, and then, in place of the first three-dimensional display, the display control means may cause the display means to carry out second three-dimensional display based on the decompressed high-resolution images decompressed by the decompressing means, the decompressed high-resolution images being displayed correspondingly to a three-dimensional display range based on the modified low-resolution images.

In the three-dimensional display device of the invention, the display means may be capable of three-dimensional display based on the two-dimensional images and two-dimensional display of one of the two-dimensional images, when the two-dimensional display of one of the two-dimensional images is carried out, the display control means may cause the display means to carry out first two-dimensional display of one of the digitally zoomed low-resolution images, and then, in place of the first two-dimensional display, the display control means may cause the display means to carry out second two-dimensional display of corresponding one of the decompressed high-resolution images decompressed by the decompressing means, the high-resolution image being displayed correspondingly to a two-dimensional display range of the digitally zoomed low-resolution image, and the three-dimensional display device may further include time setting means for setting a time period from the start of the first two-dimensional display of the digitally zoomed low-resolution image to the start of the second two-dimensional display of the decompressed high-resolution image shorter than a time period from the start of the first three-dimensional display based on the modified low-resolution images to the start of the second three-dimensional display based on the decompressed high-resolution images.

An aspect of the digital zoom correction method of the invention is a digital zoom correction method to be carried out in a three-dimensional display device including display means for carrying out three-dimensional display based on two or more two-dimensional images having parallax therebetween, and digital zoom means for digitally zooming the two-dimensional images, the method including the steps of:

obtaining a digital zoom rate of the two-dimensional images zoomed by the digital zoom means;

modifying at least one of the digitally zoomed two-dimensional images based on an enlarged amount of parallax to provide an amount of parallax between the digitally zoomed two-dimensional images equal to the enlarged amount of parallax when the digital zoom rate is larger than 100%, wherein the enlarged amount of parallax is obtained by enlarging, at a moderated digital zoom rate, an amount of parallax between the two-dimensional images before being digitally zoomed, the moderated digital zoom rate is obtained by moderating the digital zoom rate at a moderation rate, and the moderation rate increases as the zoom rate increases; and causing the display means to carry out three-dimensional display based on the modified two-dimensional images.

In the digital zoom correction method of the invention, each of the two-dimensional images may include a low-resolution image and a compressed high-resolution image, the digital zoom means may digitally zoom the low-resolution images, the modification of the parallax may be applied to at least one of the digitally zoomed low-resolution images, the compressed high-resolution images may be decompressed, and first three-dimensional display may be carried out based on the low-resolution images with the amount of parallax therebetween modified, and then, in place of the first three-dimensional display, second three-dimensional display may be carried out based on the decompressed high-resolution images, the decompressed high-resolution images being displayed correspondingly to a three-dimensional display range based on the modified low-resolution images.

In the digital zoom correction method of the invention, the display means may be capable of three-dimensional display based on the two-dimensional images and two-dimensional display of one of the two-dimensional images, when the two-dimensional display of one of the two-dimensional images is carried out, the display means may be caused to carry out first two-dimensional display of one of the digitally zoomed low-resolution images, and then, in place of the first two-dimensional display, the display means may be caused to carry out second two-dimensional display of corresponding one of the decompressed high-resolution images, the high-resolution image being displayed correspondingly to a two-dimensional display range of the digitally zoomed low-resolution image, and a time period from the start of the first two-dimensional display of the digitally zoomed low-resolution image to the start of the second two-dimensional display of the high-resolution image may be set shorter than a time period from the start of the first three-dimensional display based on the modified low-resolution images to the start of the second three-dimensional display based on the high-resolution images.

According to the three-dimensional display device and the digital zoom correction method of the invention, a digital zoom rate of two-dimensional images having parallax therebetween is obtained. When the obtained digital zoom rate is larger than 100%, at least one of the digitally zoomed two-dimensional images is modified based on an enlarged amount of parallax to provide an amount of parallax between the digitally zoomed two-dimensional images equal to the enlarged amount of parallax. The enlarged amount of parallax is obtained by enlarging, at a moderated digital zoom rate, an amount of parallax between the two-dimensional images before being digitally zoomed, the moderated digital zoom rate is obtained by moderating the digital zoom rate at a moderation rate, and the moderation rate increases as the zoom rate increases. Then, the display means is caused to carry out three-dimensional display based on the modified two-dimensional images. In this manner, the parallax between the two-dimensional images subjected to digital enlargement zoom can be weakened, thereby mitigating the user's feeling of fatigue and/or discomfort, which is caused when the user conducting stereoscopic viewing feels that the parallax is too strong and feels an excessively strong stereoscopic effect.

BRIEF DESCRIPTION OF THE DRAWINGS

FIG. 7 is a diagram for explaining conventional digital enlargement zoom, FIG. 8 is a diagram for explaining digital enlargement zoom according to the second embodiment, FIG. 9A is a flow chart illustrating a series of display operations including a digital zoom correction method carried out in the three-dimensional display device of FIG. 6, FIG. 9B is the flow chart illustrating the series of display operations including the digital zoom correction method carried out in the three-dimensional display device of FIG. 6 (continued), FIG. 10 is a schematic block diagram illustrating the configuration of a three-dimensional display device according to a third embodiment of the invention, FIG. 11A is a flow chart illustrating a series of display operations including a digital zoom correction method carried out in the three-dimensional display device of FIG. 10.

DESCRIPTION OF THE PREFERRED EMBODIMENTS

Figure 1:
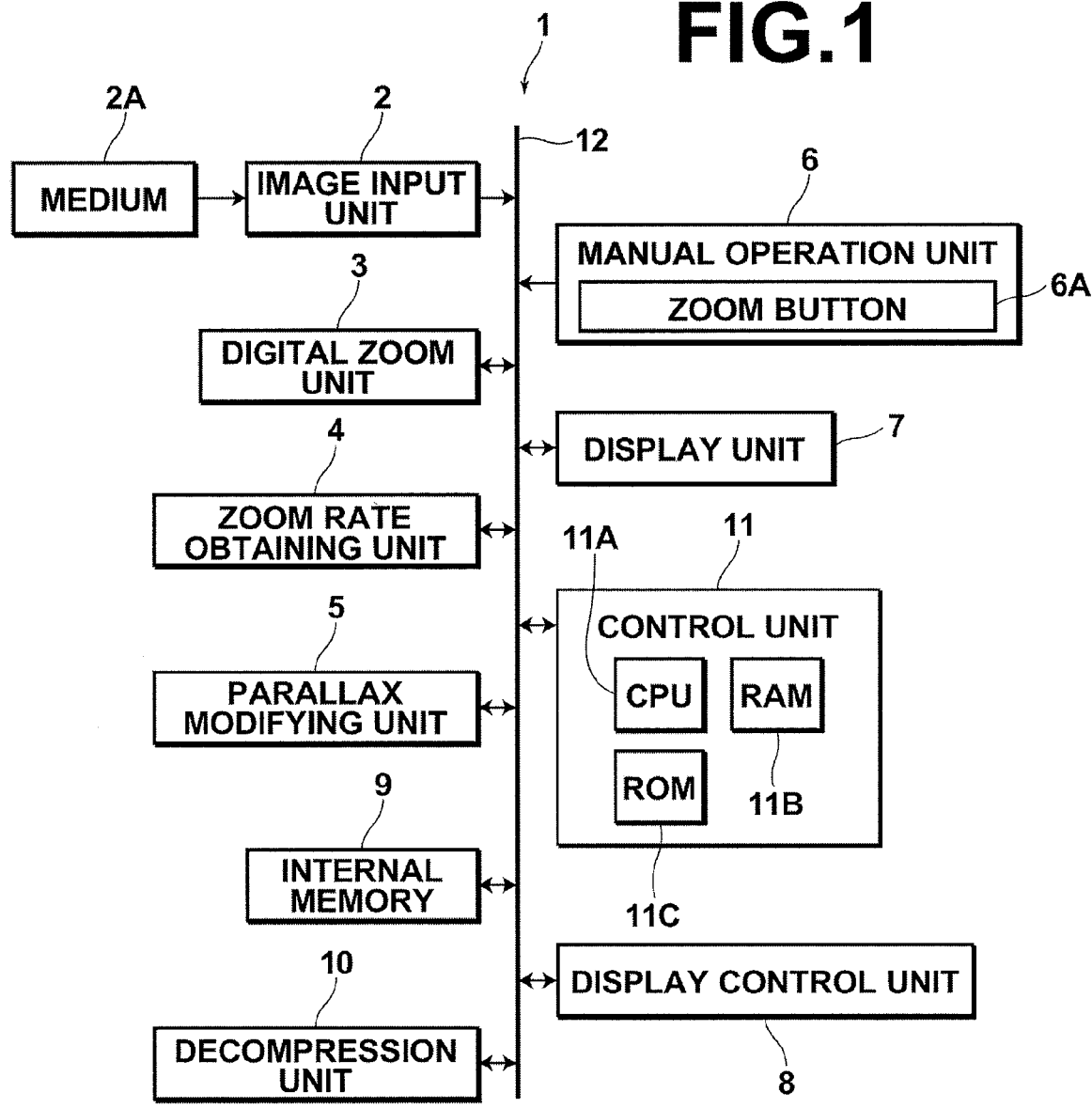
FIG. 1 is a schematic block diagram illustrating the configuration of a three-dimensional display device according to a first embodiment of the invention.
Figure 2:
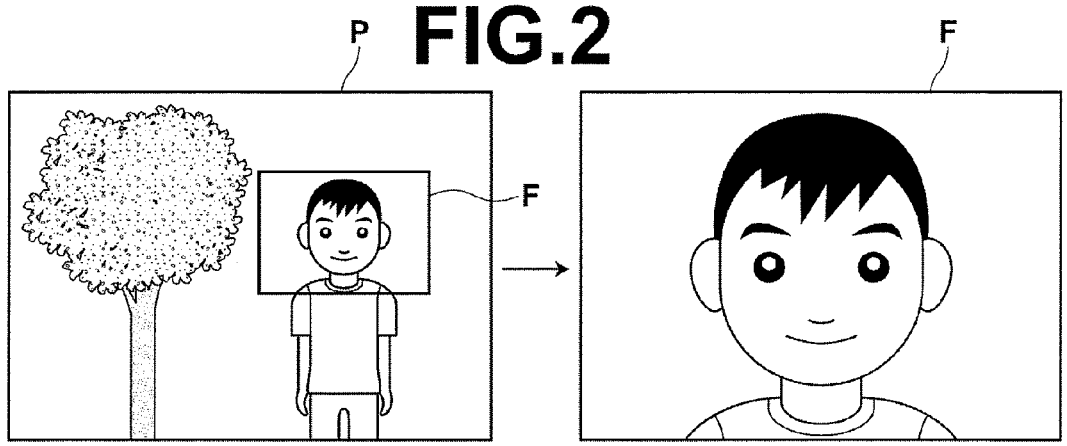
FIG. 2 is a diagram for explaining digital enlargement zoom.
Figure 3:
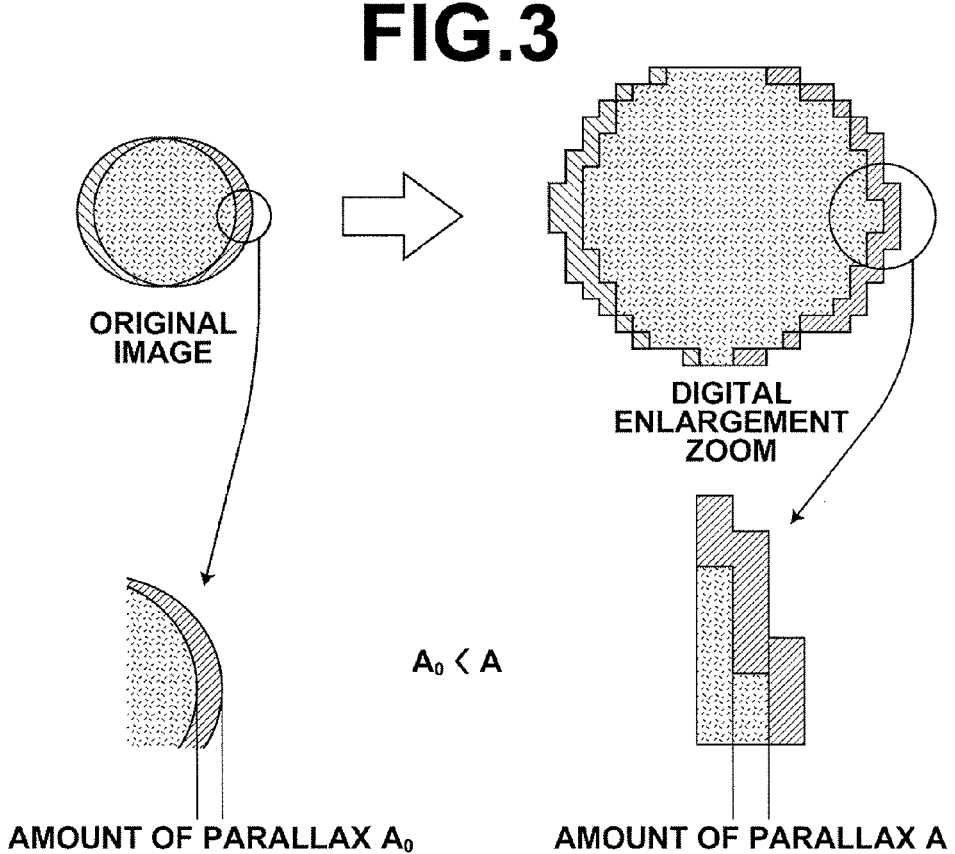
FIG. 3 is a diagram for explaining an amount of parallax during digital enlargement zoom.

Now, a first embodiment according to the present invention is described with reference to the drawings. FIG. 1 is a schematic block diagram illustrating the configuration of a three-dimensional display device 1 according to the first embodiment of the invention, FIG. 2 is a diagram for explaining digital enlargement zoom, and FIG. 3 is a diagram for explaining an amount of parallax during the digital enlargement zoom. As shown in FIG. 1, the three-dimensional display device 1 according to the first embodiment includes: an image input unit 2; a digital zoom unit 3; a zoom rate obtaining unit (zoom rate obtaining means) 4; a parallax modifying unit (parallax modifying means) 5; a manual operation unit 6 including a keyboard and a mouse for making various inputs and a zoom button 6A for instruction of a zoom amount for reduction zoom or enlargement zoom carried out by the digital zoom unit 3; a display unit (display means) 7, such as a liquid crystal monitor, for various displays; a display control unit 8 for causing the display unit 7 to carry out two-dimensional display or three-dimensional display; an internal memory 9 for storing various information; a decompression unit (decompressing means) 10 for decompressing inputted image data; and a control unit 11, which are connected via a bus 12.

The image input unit 2 is used to input to the device 1 an image file for three-dimensional display storing two or more two-dimensional images having parallax therebetween, which are used for displaying a three-dimensional image on the display unit 7 of the three-dimensional display device 1. The image input unit 2 may be any of various known means for inputting an image file, such are a media drive, which reads out the image file for three-dimensional display from a medium 2A with the image file recorded thereon, or a wired or wireless interface for receiving the image file inputted via a network. In this embodiment, the image input unit 2 reads out the image file from the medium 2A.

The two-dimensional images stored in the image file are compressed according to a certain compression format, such as JPEG. Therefore, the inputted two-dimensional images are decompressed by the decompression unit 10 before being used in subsequent operations.

The two-dimensional images having parallax therebetween herein are obtained by photographing a subject from different photographing positions, and there is a parallax between the subject images contained in the two-dimensional images depending on a difference between the photographing positions. In the following description of this embodiment, two two-dimensional images having parallax therebetween are used. The two two-dimensional images have been obtained through photographing at two photographing positions, i.e., left and right photographing positions, and the images are referred to as a right image and a left image, respectively.

The digital zoom unit 3 digitally zooms the left and right images depending on the amount of manual operation of the zoom button 6A of the manual operation unit 6. Specifically, as shown in FIG. 2, for example, only image data of the left and right images corresponding to a person's face F in an image P, shown on the left in the drawing, may be enlarged, and image data corresponding to the surrounding areas may be trimmed away to generate an image only containing the person's face F, as shown on the right in the drawing.

The zoom rate obtaining unit 4 obtains a digital zoom rate of the right and left images zoomed by the digital zoom unit 3 by detecting the amount of manual operation of the zoom button 6A.

The parallax modifying unit 5 modifies an amount of parallax between the digitally zoomed right and left images when the digital zoom rate obtained by the zoom rate obtaining unit 4 is larger than 100%. It is assumed here, for example, that the left and right images before digital zoom are images of 160×120 pixels, and each image contains a circle. Since the left and right images have parallax therebetween, the position of the circle differs between the right and left images. As shown on the left in FIG. 3, a positional deviation between the circles along the horizontal direction is an amount of parallax $A_0$. When the left and right images are enlarged by the digital zoom unit 3 by the factor of, for example, 400%, i.e., to the size of 640×480 pixels with the circle in each image being the center, the image resolution becomes lower than that before digital zoom, as shown on the right in FIG. 3, and the line of the circumference in the digitally zoomed images is rougher than that in the images before digital zoom. Therefore, an amount of parallax A between the digitally zoomed images (on the right in FIG. 3) is not a quadruple of the amount of parallax $A_0$ between the images before digital zoom (on the left in FIG. 3), and this introduces parallax errors.

With the parallax errors, when the display control unit 8 causes the display unit 7 to carry out three-dimensional display based on the digitally zoomed left and right images and the user conducting stereoscopic viewing views the display unit 7, the three-dimensional image may be distorted when compared with the three-dimensional image based on the left and right images before digital zoom, or may have a different perspective or stereoscopic effect. If the amount of parallax A is smaller than a quadruple of the amount of parallax $A_0$, the user feels that the stereoscopic effect is weak. In contrast, if the amount of parallax A is larger than a quadruple of the amount of parallax $A_0$, the user feels that the stereoscopic effect is strong.

Usually, when a weaker stereoscopic effect is provided, the displayed image appears rather like a two-dimensional image, and this is not particularly problematic. However, if, for example, an excessively strong stereoscopic effect is provided, the user conducting stereoscopic viewing may feel fatigue and/or discomfort.

Therefore, in this embodiment, the parallax modifying unit 5 modifies the amount of parallax such that the amount of parallax A smaller than a quadruple of the amount of parallax $A_0$ is provided, in order to prevent an excessively strong stereoscopic effect of the three-dimensional display based on the digitally zoomed left and right images.

Figure 4:
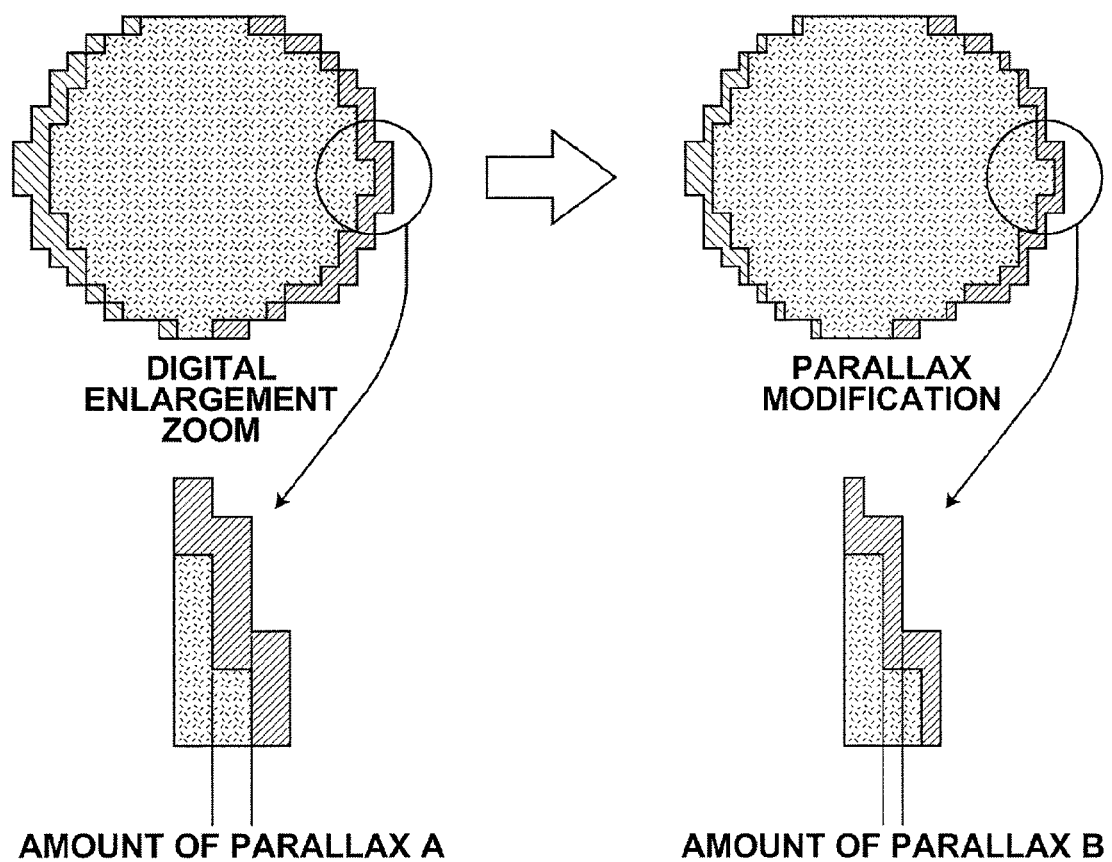
FIG. 4 is a diagram for explaining parallax modification.

Now, parallax modification according to this embodiment is described. FIG. 4 is a diagram for explaining the parallax modification. In general, one pixel is the smallest unit when an image is handled on a computer. Pixel is a picture element having color information (such as hue and tone values), which is expressed with integers. In this embodiment, when calculation is carried out in terms of pixels, the calculated value is rounded to the nearest whole number, such that a value in a range from 0.6 to 1.4 pixels is regarded as one pixel. Thus, the maximum value of a possible error for one pixel is 0.4 pixels.

If the amount of parallax $A_0$ between left and right images before digital zoom shown in FIG. 3 is, for example, 100 pixels, the amount of parallax A after digital zoom by the factor of 400% is calculated as 100×4=400 pixels. However, the calculated value of 400 pixels may actually contain an error of 0.4×4=1.6≈two pixels. Therefore, as shown in FIG. 4, the amount of parallax is modified to reduce the amount of parallax from the amount of parallax A, i.e., 400 pixels, by an amount of two pixels, which is the value of possible error, to provide a modified amount of parallax B of 400−2=398 pixels.

This parallax modification is achieved by shifting the position of the circle in the left image by a distance of two pixels in the horizontal direction to reduce the deviation from the position of the circle in the right image. Although the left image is modified in this embodiment, this is not intended to limit the invention. For example, the position of the circle in the right image may be shifted by the distance of two pixels in the horizontal direction to reduce the deviation from the position of the circle in the left image, or each of the positions of the circles in the left and right images may be shifted by a distance of one pixel in the horizontal direction to reduce the deviation.

By modifying the amount of parallax to provide the amount of parallax B between the digitally zoomed left and right images which is smaller than a proper amount of parallax without errors, the parallax between the digitally zoomed enlarged left and right images can be weakened, thereby mitigating the user's feeling of fatigue and/or discomfort, which is caused when the user conducting stereoscopic viewing feels that the parallax is too strong and feels an excessively strong stereoscopic effect.

The above-described manner of the parallax modification of this embodiment is not intended to limit the invention. When the digital zoom rate obtained by the zoom rate obtaining unit 4 is larger than 100%, the digitally zoomed left image may be modified based on an enlarged amount of parallax B, which is obtained by enlarging the amount of parallax $A_0$ between the left and right images before digital zoom at a moderated digital zoom rate moderated at a moderation rate which increases as the zoom rate increases, so that the amount of parallax A between the digitally zoomed left and right images which is equal to the enlarged amount of parallax B is provided. Specifically, in a case where the amount of parallax $A_0$ between the left and right images before digital zoom is 100 pixels, if the digital zoom rate is 400%, a moderated digital zoom rate of 398% may be applied, and if the digital zoom rate is 1000%, a moderated digital zoom rate of 996% may be applied, so that an enlarged amount of parallax B of 398 pixels is provided when the digital zoom rate is 400%, and an enlarged amount of parallax B of 996 pixels is provided when the digital zoom rate is 1000%. The values of the moderated digital zoom rate may be altered as appropriate.

The display control unit 8 causes the display unit 7 to two-dimensional display the left image or the right image recorded on the medium 2A or the internal memory 9, or causes the display unit 7 to carry out three-dimensional display based on the left and right images. When three-dimensional display is carried out by the display unit 7, three-dimensional processing is applied according to the three-dimensional display system employed in the display unit 7. Any known system may be used for three-dimensional display in this embodiment. For example, the left and right images may be displayed side by side to achieve the stereoscopic viewing through parallel viewing with naked eyes, or the three-dimensional display may be achieved using a lenticular system, in which a lenticular lens is attached on the display unit 7, and the left and right images are displayed at predetermined positions on the display surface of the display unit 7 so that the left and right images are respectively viewed by the left and right eyes. As another example, a scanning backlight system may be used, which achieves the three-dimensional display by optically separating optical paths of backlights of the display unit 7 correspondingly to the left and right eyes in an alternate manner, and alternately displaying the left and right images on the display surface of the display unit 7 according to the separation of the backlights to the left and right.

The display unit 7 is modified according to the type of the three-dimensional display system. For example, when the three-dimensional display system is implemented with the lenticular system, a lenticular lens is attached on the display surface of the display unit 7. In the case of the scanning backlight system, an optical element for changing directions of the light beams from the left and right images is attached on the display surface of the display unit 7.

Switching between the two-dimensional display and the three-dimensional display may be provided automatically, or may be provided according to instructions from the user conducting stereoscopic viewing via the manual operation unit 6. When the display mode is switched to three-dimensional display, both of the left and right images are used for display. When the display mode is switched to two-dimensional display, one of the left and right images is used for display. In this embodiment, the left image is used for two-dimensional display.

The control unit 11 includes a CPU 11A, a RAM 11B, which provides a work space for various processing operations, and a ROM 11C, which stores operation programs for the device 1, various constants, etc. The control unit 11 controls operations of the units of the device 1. The configuration of the three-dimensional display device 1 of this embodiment is as described above.

Figure 5:
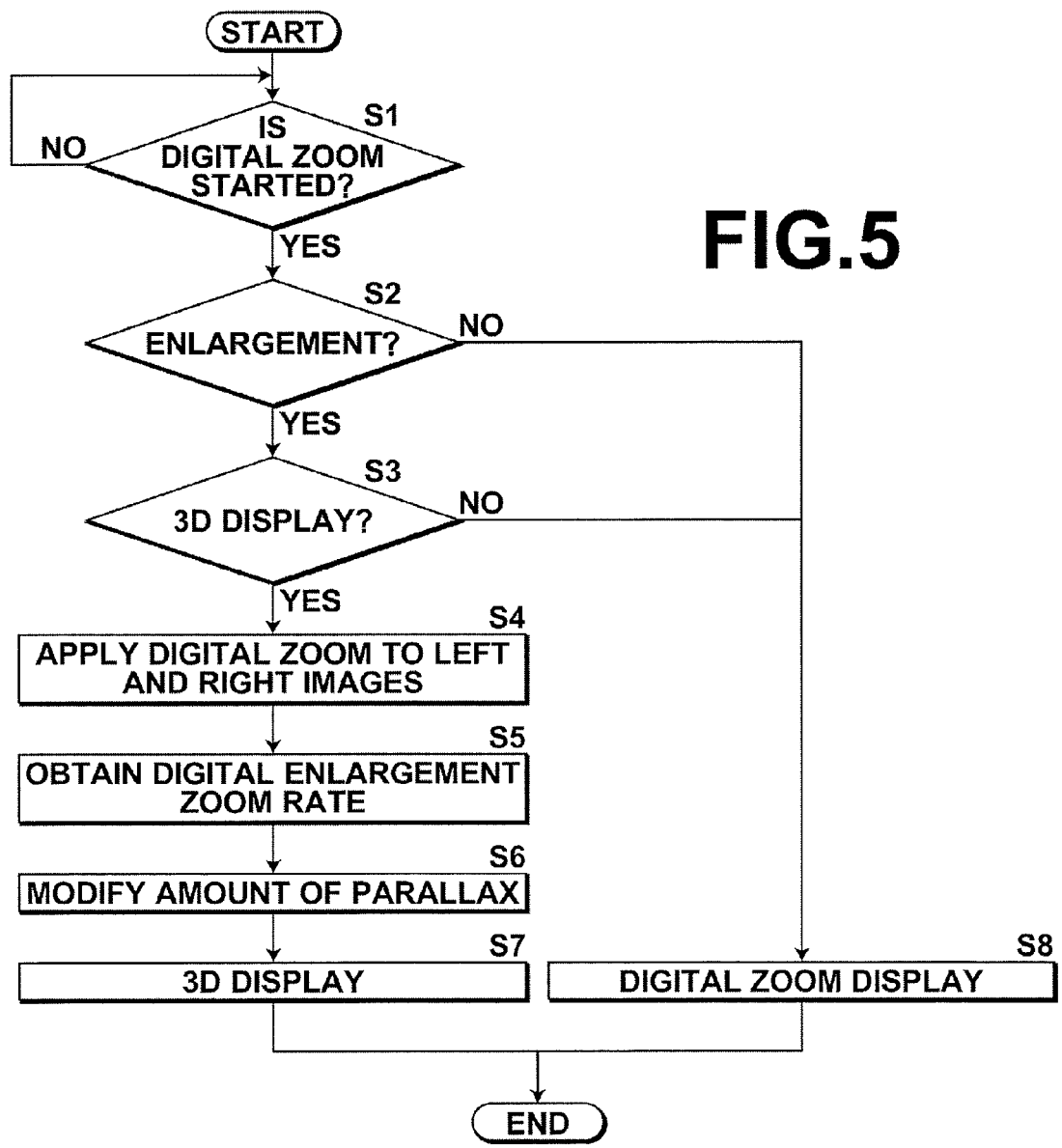
FIG. 5 is a flow chart illustrating a series of display operations including a digital zoom correction method carried out in the three-dimensional display device of FIG. 1.

Next, a series of display operations including a digital zoom correction method to be carried out in the three-dimensional display device 1 of this embodiment are described. FIG. 5 is a flow chart illustrating the series of display operations including the digital zoom correction method carried out in the three-dimensional display device 1. It should be noted that the three-dimensional display device 1 has, in advance, read out the image file for three-dimensional display storing the left and right images, which are the two-dimensional images having parallax therebetween, recorded on the medium 2A via the image input unit 2, decompressed the read-out left and right images via the decompression unit 10, and caused, via the display control unit 8, the display unit 7 to carry out three-dimensional display based on the decompressed left and right images or two-dimensional display based on the decompressed left image.

Then, as shown in FIG. 5, the CPU 11A determines whether or not the zoom button 6A is operated to determine whether or not digital zoom by the digital zoom unit 3 is started. If it is determined that the digital zoom is not started (step S1: NO), the operation in step S1 is repeated until the digital zoom is started while the display unit 7 continues the above-described three-dimensional display.

If it is determined in step S1 that the digital zoom is started (step S1: YES), the zoom rate obtaining unit 4 determines whether or not the digital zoom by the digital zoom unit 3 is enlargement zoom, i.e., whether or not the digital zoom rate is larger than 100%. If it is determined that the digital zoom rate is smaller than 100% (step S2: NO), then, it is determined that the digital zoom is reduction zoom, and reduction zoom is applied to the left and right images depending on the amount of manual operation of the zoom button 6A. Then, if the display control unit 8 is causing the display unit 7 to carry out three-dimensional display, then, the display unit 7 is caused to carry out three-dimensional display based on the left and right images after the reduction zoom, or if the display control unit 8 is causing the display unit 7 to carry out two-dimensional display, then, the display unit 7 is caused to carry out two-dimensional display based on the left image after the reduction zoom (step S8).

On the other hand, if it is determined in step S2 that the digital zoom is enlargement zoom (step S2: YES), then, the CPU 11A determines whether or not the display unit 7 displays a three-dimensional image. If it is determined that the display unit 7 is not carrying out three-dimensional display, i.e., is carrying out two-dimensional display (step S3: NO), enlargement zoom is applied to the left and right images depending on the amount of manual operation of the zoom button 6A, and the display unit 7 is caused to carry out two-dimensional display based on the left image after the enlargement zoom (step S8).

If it is determined in step S3 that three-dimensional display is being carried out (step S3: YES), the digital zoom unit 3 applies enlargement zoom to the left and right images depending on the amount of manual operation of the zoom button 6A (step S4), and the zoom rate obtaining unit 4 obtains the digital enlargement zoom rate in the manner as described above (step S5).

Then, the parallax modifying unit 5 applies modification in the manner as described above to reduce the amount of parallax A between the left and right images after the digital enlargement zoom (step S6). Then, the display control unit 8 causes the display unit 7 to carry out three-dimensional display based on the modified left and right images (step S7). In this embodiment, when the zoom button 6A is manually operated while the display unit 7 is carrying out three-dimensional display based on the left and right images before digital zoom, the above-described digital zoom processing and parallax modification are applied to the left and right images depending on the amount of manual operation of the zoom button 6A after the manual operation of the zoom button 6A is stopped. Then, the display control unit 8 causes the display unit 7 to carry out three-dimensional display based on the left and right images after the digital zoom processing and parallax modification.

Although the digital zoom processing in this embodiment is applied after the manual operation of the zoom button 6A, this is not intended to limit the invention. For example, the above-described digital zoom processing and parallax modification may be applied to the left and right images at predetermined time intervals during the manual operation of the zoom button 6A, and the display control unit 8 may cause the display unit 7 to carry out three-dimensional display based on the left and right images after the digital zoom processing and parallax modification. The series of operations carried out by three-dimensional display device 1 of this embodiment are as described above.

As described above, according to the three-dimensional display device 1 of this embodiment, when digital enlargement zoom is applied to three-dimensional display based on the left and right images, the amount of parallax is modified according to the digital zoom rate such that a smaller parallax is provided for a higher zoom rate, thereby preventing providing a parallax larger than the parallax without errors. In this manner, the user's feeling of fatigue and/or discomfort, which is caused when the user conducting stereoscopic viewing feels that the parallax is too strong and feels an excessively strong stereoscopic effect, can be mitigated.

Figure 6:
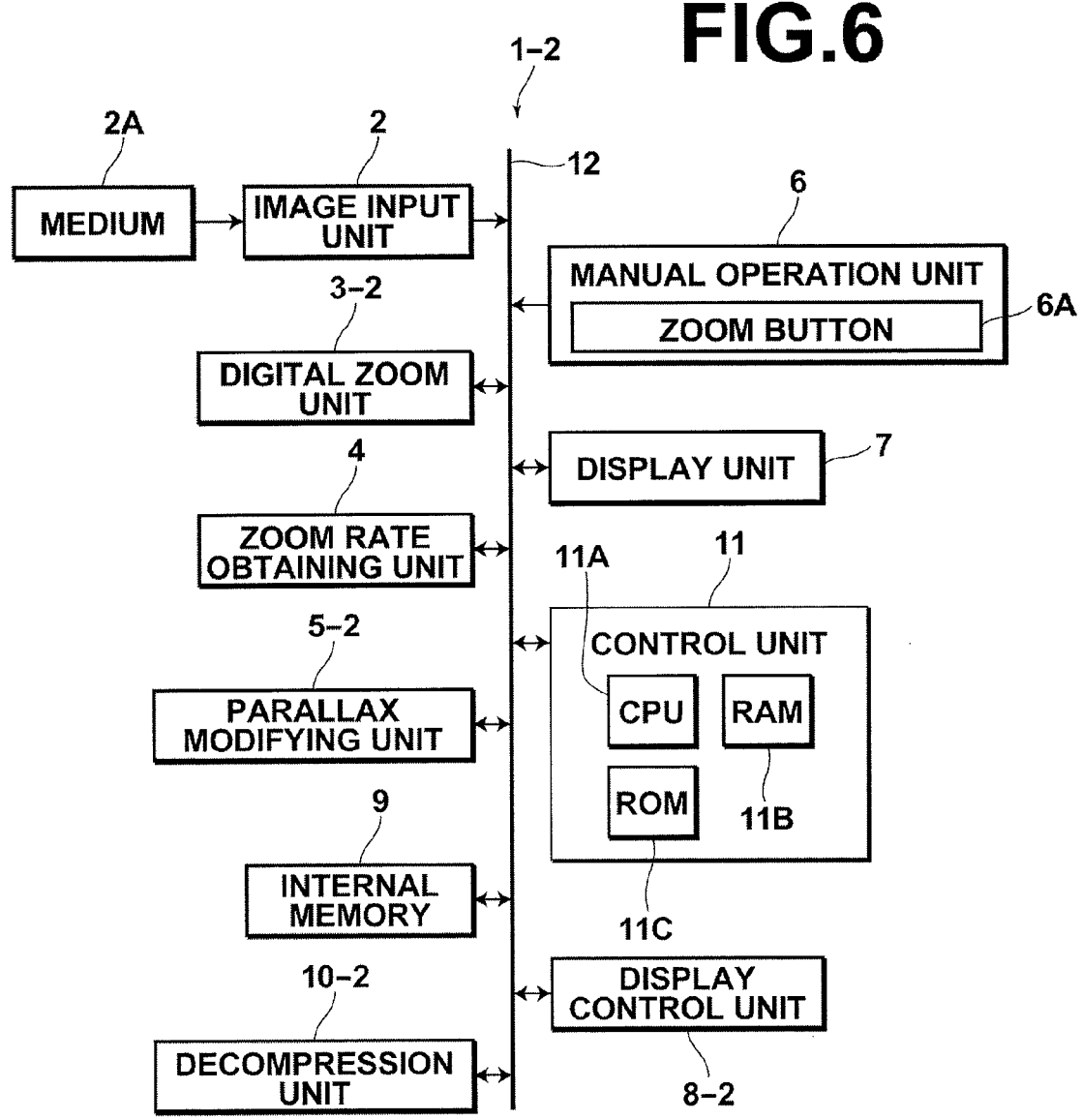
FIG. 6 is a schematic block diagram illustrating the configuration of a three-dimensional display device according to a second embodiment of the invention.

Next, a second embodiment according to the invention is described with reference to the drawings. FIG. 6 is a schematic block diagram illustrating the configuration of a three-dimensional display device 1-2 according to a second embodiment of the invention, FIG. 7 is a diagram for explaining conventional digital enlargement zoom, and FIG. 8 is a diagram for explaining digital enlargement zoom according to the second embodiment. In FIG. 6, components that are the same as those of the three-dimensional display device 1 shown in FIG. 1 are denoted by the same reference numerals for the sake of convenience, and explanation thereof is omitted.

The three-dimensional display device 1-2 of this embodiment is capable of high-speed display. As shown in FIG. 6, the image file, which is inputted from the medium 2A to the device 1-2 via the image input unit 2, stores the left and right images. The left and right images each includes a low-resolution image and a high-resolution image, which have been subjected to data compression. Although both the low-resolution image and the high-resolution image are compressed in this embodiment, the low-resolution image may not necessarily be compressed. A digital zoom unit 3-2 of this embodiment applies digital zoom to the low-resolution images of the left and right images. A parallax modifying unit 5-2 of this embodiment modifies an amount of parallax between the low-resolution images, which have been subjected to the digital enlargement zoom, of the left and right images.

As shown in FIG. 7, with display devices that carry out two-dimensional display or three-dimensional display and are capable of high-speed display, in general, when an image is displayed on the display unit 7, first, a low-resolution image(s) having a low resolution and allowing a high image processing speed is subjected to digital enlargement zoom and displayed to fit the image(s) to the display surface of the display unit 7, and the digitally zoomed low-resolution image(s) being displayed is replaced with a decompressed high-resolution image(s), which is displayed correspondingly to a display range of the digitally zoomed low-resolution image(s), thereby achieving the high-speed image display on the display unit 7.

As shown in FIG. 7, when high-speed three-dimensional display is carried out in the manner as described above and the digital enlargement zoom is applied to the low-resolution images, the amount of parallax A between the digitally zoomed low-resolution images (on the middle in FIG. 7) is not equal to a quadruple of the amount of parallax $A_0$ between the low-resolution images before digital zoom (on the left in FIG. 7), and this introduces parallax errors, similarly to the above-described embodiment. With the parallax errors, when three-dimensional display is carried out based on the low-resolution images of the left and right images after the digital enlargement zoom, the amount of parallax A larger than a quadruple of the amount of parallax $A_0$ may provide the user conducting stereoscopic viewing with an excessively strong stereoscopic effect, and the user may feel fatigue and/or discomfort.

The resolution of the low-resolution images is usually lower than the screen resolution of the display unit 7. Therefore, when a part of the displayed image is enlarged, the digital zoom applied to the image further reduces the resolution, i.e., degrades the image quality of the enlarged image being displayed. On the other hand, the resolution of the high-resolution images is usually higher than the screen resolution of the display unit 7. Therefore, when the image is displayed, the resolution of the image is adjusted to the screen resolution of the display unit 7. When a part of the displayed image is enlarged, it is not necessary to apply digital zoom, and the resolution of the part of the image to be enlarged is adjusted to the screen resolution. Thus, the image before enlargement and the enlarged image have the same display resolution.

Therefore, when the high-resolution images are three-dimensionally displayed correspondingly to the display range of the digitally zoomed low-resolution images, no parallax errors are introduced since, for example, at a digital zoom rate of 400%, an amount of parallax $A_0'$ between the high-resolution images of the left and right images is equal to a quadruple of the amount of parallax $A_0$ between the low-resolution images of the left and right images.

As shown in FIG. 8, in the display control unit 8-2 of this embodiment, the parallax modifying unit 5-2 modifies the amount of parallax between the low-resolution images (on the left in FIG. 8) of the left and right images, which are digitally zoomed by the digital zoom unit 3-2, in the same manner as in the above-described embodiment, and three-dimensional display is carried out based on the modified low-resolution images of the left and right images (on the middle in FIG. 8). Then, this three-dimensionally display is replaced with three-dimensional display based on the high-resolution images decompressed by the decompression unit 10-2 (on the right in FIG. 8), which are displayed correspondingly to the three-dimensional display range of the modified low-resolution images of the left and right images.

In this manner, the high-speed display can be achieved by displaying the high-resolution images on the display unit 7 after the low-resolution images, which allow high processing speed, are displayed on the display unit 7. In addition, by modifying the amount of parallax B between the digitally zoomed left and right images such that a parallax smaller than the original parallax without errors is provided between the digitally zoomed left and right images, the parallax between the left and right images enlarged through digital zoom can be weakened, thereby mitigating the user's feeling of fatigue and/or discomfort, which is caused when the user conducting stereoscopic viewing feels that the parallax is too strong and feels an excessively strong stereoscopic effect. The configuration of the three-dimensional display device 1-2 of this embodiment is as described above.

Next, a series of display operations including a digital zoom correction method to be carried out in the three-dimensional display device 1-2 of this embodiment is described. FIGS. 9A and 9B show a flow chart illustrating the series of display operations including the digital zoom correction method to be carried out in the three-dimensional display device 1-2. It should be noted that the three-dimensional display device 1-2 has, in advance, read out the image file for three-dimensional display storing the left and right images, which are the two-dimensional images having parallax therebetween, recorded on the medium 2A via the image input unit 2, and has decompressed the read-out left and right images via the decompression unit 10.

Then, as shown in FIG. 9A, the CPU 11A determine whether or not each of the left and right images read out by the image input unit 2 includes the low-resolution image and the high-resolution image. If negative determination is made (step S11: NO), then, determination is made as to whether or not a three-dimensional image is to be displayed on the display unit 7, as shown in FIG. 9B. If it is determined not to carry out three-dimensional display, i.e., it is determined to carry out two-dimensional display (step S23: NO), the low-resolution image or the high-resolution image of the left image is two-dimensionally displayed to fit the image to the display surface of the display unit 7 (step S30).

If it is determined in step S23 that three-dimensional display is carried out (step S23: YES), the CPU 11A determines whether or not the images are the low-resolution images (step S24). If the image is the low-resolution image (step S24: YES), then, the digital zoom unit 3 applies enlargement zoom to the low-resolution images of the left and right images to fit the images to the display surface of the display unit 7 (step S25), and the zoom rate obtaining unit 4 obtains the digital enlargement zoom rate in the same manner as described above (step S26).

Then, the parallax modifying unit 5-2 applies the modification in the same manner as in the above-described embodiment to reduce the amount of parallax A between the low-resolution images of the left and right images after the digital enlargement zoom (step S27), and the display control unit 8-2 causes the display unit 7 to carry out three-dimensional display based on the modified low-resolution images of the left and right images (step S28).

On the other hand, if it is determined in step S24 that the images are not the low-resolution images (step S24: NO), the decompression unit 10-2 decompresses the high-resolution images of the left and right images (step S29). Then, the CPU 11A forwards the process to step S28, and the display control unit 8-2 causes the display unit 7 to carry out three-dimensional display based on the decompressed high-resolution images of the left and right images (step S28).

Further, as shown in FIG. 9A, if affirmative determination is made by the CPU 11A in step S11 as to each of the left and right images read out by the image input unit 2 includes the low-resolution image and the high-resolution image (step S11: YES), then, determination is made as to whether or not a three-dimensional image is to be displayed on the display unit 7. If it is determined not to carry out three-dimensional display, i.e., it is determined to carry out two-dimensional display (step S12: NO), then, the digital zoom unit 3-2 applies enlargement zoom to the low-resolution image of the left image to fit the image to the display surface of the display unit 7, and the display unit 7 is caused to carry out two-dimensional display based on the low-resolution image of the left image after the enlargement zoom (step S20), as shown in FIG. 9B.

Then, the decompression unit 10-2 decompresses the high-resolution image of the left image (step S21), and the display control unit 8-2 replaces the two-dimensional display of the low-resolution image with two-dimensional image display based on the decompressed high-resolution image, which is displayed correspondingly to the two-dimensional display range based on the low-resolution image (step S22).

On the other hand, as shown in FIG. 9A, if it is determined in step S12 to carry out three-dimensional display (step S12: YES), the digital zoom unit 3-2 applies enlargement zoom to the low-resolution images of the left and right images to fit the images to the display surface of the display unit 7 (step S13), and the zoom rate obtaining unit 4 obtains the digital enlargement zoom rate in the manner as described above (step S14).

Then, the parallax modifying unit 5-2 applies the modification in the same manner as in the above-described embodiment to reduce the amount of parallax A between the low-resolution images of the left and right images after the digital enlargement zoom (step S15), and the display control unit 8-2 causes the display unit 7 to carry out three-dimensional display based on the modified low-resolution images of the left and right images (step S16).

Then, the decompression unit 10-2 decompresses the high-resolution images of the left and right images (step S17), and the display control unit 8-2 replaces the three-dimensional display of the low-resolution images with three-dimensional display based on the decompressed high-resolution images, which are displayed correspondingly to the three-dimensional display range based on the low-resolution images (step S18). The series of operations carried out in the three-dimensional display device 1-2 of this embodiment are as described above.

As described above, according to the three-dimensional display device 1-2 of this embodiment, the high-speed display can be achieved by displaying the high-resolution images on the display unit 7 after the low-resolution images, which allow high processing speed, are displayed on the display unit 7. In addition, when digital enlargement zoom is applied to three-dimensional display based on the low-resolution images of the left and right images, the amount of parallax is modified according to the digital zoom rate such that a smaller parallax is provided for a higher zoom rate, thereby preventing providing a parallax larger than the parallax without errors. In this manner, the user's feeling of fatigue and/or discomfort, which is caused when the user conducting stereoscopic viewing feels that the parallax is too strong and feels an excessively strong stereoscopic effect, can be mitigated.

Figure 11B:
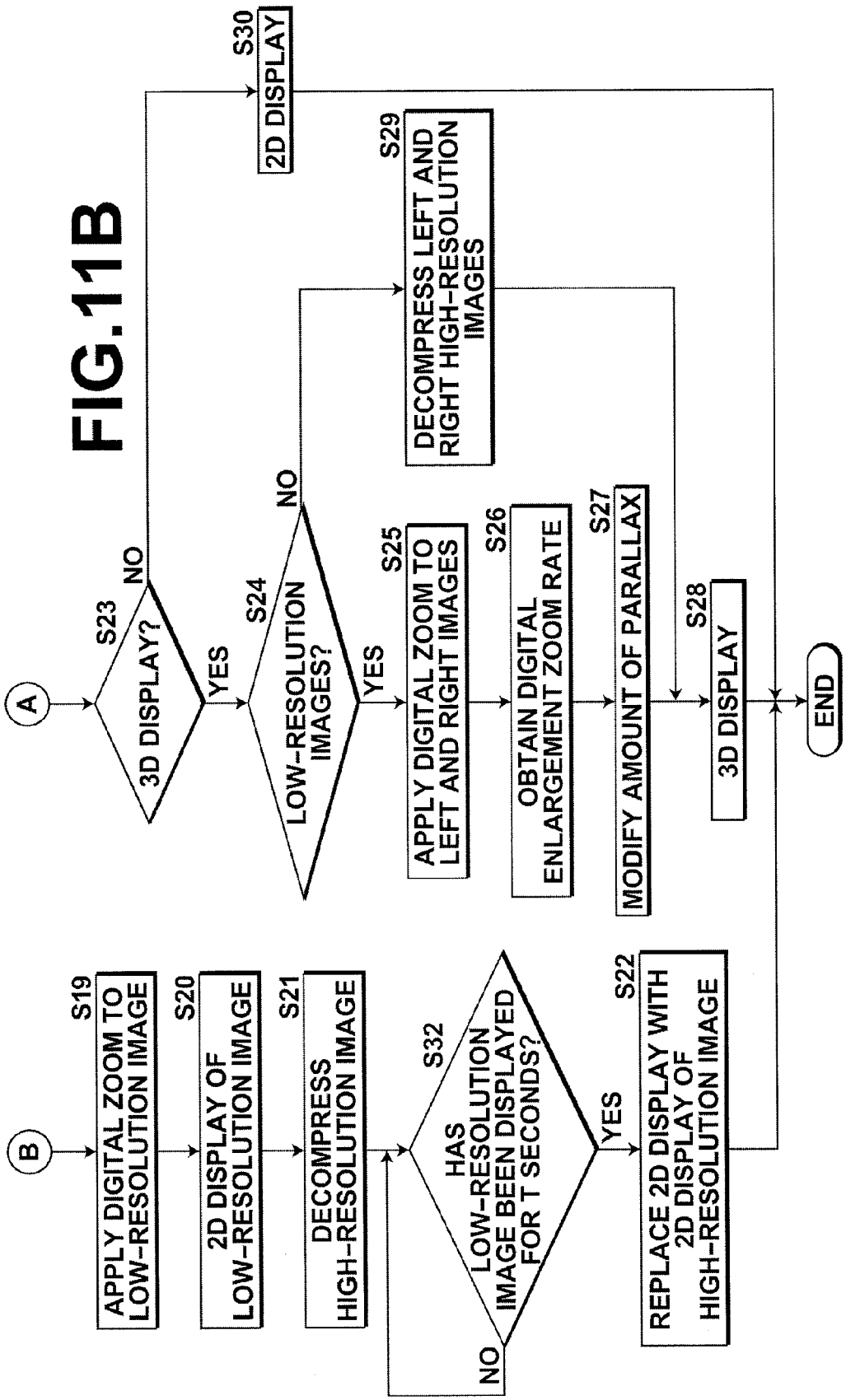
FIG. 11B is the flow chart illustrating the series of display operations including the digital zoom correction method carried out in the three-dimensional display device of FIG. 10 (continued)
Figure 12:
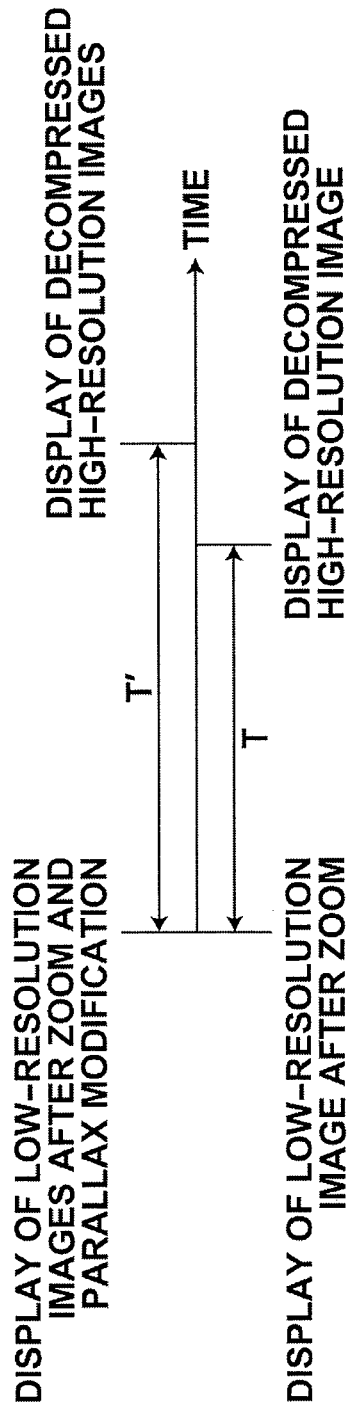
FIG. 12 is a diagram for explaining time setting by a time setting unit 13.

Next, a third embodiment according to the invention is described with reference to the drawings. FIG. 10 is a schematic block diagram illustrating the configuration of a three-dimensional display device 1-3 according to a third embodiment of the invention, FIGS. 11A and 11B show a flow chart illustrating a series of display operations including a digital zoom correction method carried out in the three-dimensional display device 1-3, and FIG. 12 is a diagram for explaining time setting by a time setting unit 13, which will be described later. In FIG. 10, components that are the same as those of the three-dimensional display device 1-2 shown in FIG. 6 are denoted by the same reference numerals for the sake of convenience, and explanation thereof is omitted.

In the three-dimensional display device 1-3 of this embodiment, the display unit 7 is capable of two-dimensional display and three-dimensional display. As shown in FIG. 12, the time setting unit (time setting means) 13 sets a time period T shorter than a time period T', where the time period T is a time period from the start of two-dimensional display based on the low-resolution image of the left image after the digital enlargement zoom by the digital zoom unit 3-2 to the start of two-dimensional display based on the decompressed high-resolution image of the left image decompressed by the decompression unit 10-2, and the time period T' is a time period from the start of three-dimensional display based on the low-resolution images of the left and right images after the digital enlargement zoom by the digital zoom unit 3-2 and the parallax modification by the parallax modifying unit 5-2 to the start of three-dimensional display based on the decompressed high-resolution images of the left and right images decompressed by the decompression unit 10-2.

Since the stereoscopic viewing is achieved by producing the stereoscopic effect of the image in the brain of the user, the stereoscopic effect of the image is abruptly changed when the display is switched. The stereoscopic viewing is achieved by obtaining a merged view of the stereoscopic image, which is attained via the automatic focusing function of the eyes. Therefore, the user conducting stereoscopic viewing may experience strong feeling of fatigue by abrupt change of the stereoscopic effect each time the display is switched.

By setting the time period T' for three-dimensional display longer than the time period T for two-dimensional display via the time setting unit 13, as described above, the time period of three-dimensional display based on two images having parallax therebetween, i.e., the three-dimensional display based on the parallax-modified low-resolution images of the left and right images becomes relatively longer. This allows the user conducting stereoscopic viewing to adjust his or her eyes to this three-dimensional display to a certain degree before the user views the next three-dimensional display, i.e., the three-dimensional display based on the decompressed high-resolution images, thereby mitigating the user's feeling of fatigue due to the abrupt change of parallax.

The display control unit 3 carries out two-dimensional display or three-dimensional display based on the low-resolution image(s) according to the time period set by the time setting unit 13. The configuration of the three-dimensional display device of this embodiment 1-3 is as described above.

Next, a series of display operations including a digital zoom correction method to be carried out in the three-dimensional display device 1-3 of this embodiment are described. In FIGS. 11A and 11B, operations which are the same as those in the flow chart shown in FIGS. 9A and 9B are denoted by the same step numbers for the sake of convenience, and explanation thereof is omitted.

As shown in FIG. 11A, in the three-dimensional display device 1-3 of this embodiment, it is determined in step S12 whether or not a three-dimensional image is to be displayed on the display unit 7. If it is determined not to carry out three-dimensional display, i.e., it is determined to carry out two-dimensional display (step S12: NO), operations in step S19 and the following steps, as shown in FIG. 11B, are carried out.

Then, in step S21, the decompression unit 10-2 decompresses the high-resolution image of the left image (step S21), and the CPU 11A determines whether or not the time period T (T seconds) set by the time setting unit 13 has elapsed from the start of the two-dimensional display based on the low-resolution image of the left image in step S20, i.e., whether or not the low-resolution image of the left image has been displayed on the display unit 7 for T seconds. If the time period T (T seconds) has not been elapsed (step S32: NO), the operation in step S32 is repeated until the low-resolution image of the left image has been displayed for T seconds. On the other hand, if T seconds has been elapsed (step S32: YES), the display control unit 8-3 replaces the low-resolution image of the left image being displayed with two-dimensional display based on the high-resolution image of the left image decompressed in step S21, which is displayed on the display unit 7 correspondingly to the two-dimensional display range of the low-resolution image of the left image (step S22).

Further, as shown in FIG. 11A, after the decompression unit 10-2 has decompressed the high-resolution images of the left and right images in step S17 (step S17), the CPU 11A determines whether or not the time period T' (T' seconds) set by the time setting unit 13 has elapsed from the start of the three-dimensional display based on the low-resolution images of the left and right images, i.e., whether or not the three-dimensional display based on the low-resolution images of the left and right images on the display unit 7 has been carried out for a time period longer than T seconds. If the three-dimensional display has not been carried out for a time period longer than T seconds (step S31: NO), then, the operation in step S31 is repeated until the three-dimensional display has been carried out for the time period longer than T seconds. On the other hand, if the three-dimensional display has been carried out for a time period longer than T seconds (step S31: YES), the display control unit 8-3 replaces the three-dimensional display based on the low-resolution images of the left and right images with three-dimensional display based on the decompressed high-resolution images of the left and right images decompressed in step S17, which are displayed on the display unit 7 correspondingly to the three-dimensional display range of the low-resolution images of the left and right images (step S18). The series of operations carried out in the three-dimensional display device 1-3 of this embodiment are as described above.

As described above, according to the three-dimensional display device 1-3 of this embodiment, a time period of three-dimensional display based on two images having parallax therebetween, i.e., three-dimensional display based on the parallax-modified low-resolution images of the left and right images can be made relatively longer by setting the time period from the start of the two-dimensional display of the digitally zoomed low-resolution image to the start of the two-dimensional display of the decompressed high-resolution image shorter than the time period T', which is the time period from the start of three-dimensional display based on the parallax-modified low-resolution images of the left and right images to the start of the three-dimensional display based on the decompressed high-resolution images of the left and right images. This allows the user conducting stereoscopic viewing to adjust his or her eyes to the three-dimensional display based on the low-resolution images to a certain degree before the user views the next three-dimensional display, i.e., the three-dimensional display based on the decompressed high-resolution images, thereby mitigating the user's feeling of fatigue due to the abrupt change of parallax.

It should be noted that, although the parallax modification by the parallax modifying unit 5-2 is carried out in step S15 shown in FIG. 11A in this embodiment, only the time periods T, T' required for replacement with the high-resolution image or images may be set by the time setting unit 13 in the manner as described above, without carrying out the parallax modification.

The configurations of the three-dimensional display devices 1, 1-2 and 1-3 of the above-described embodiments are not intended to limit the present invention, and may be modified as appropriate without departing from the spirit and scope of the present invention.

What is claimed is:

1. A three-dimensional display device comprising:
   display section for carrying out three-dimensional display based on two or more two-dimensional images having parallax therebetween;
   digital zoom section for digitally zooming the two-dimensional images;
   zoom rate obtaining section for obtaining a digital zoom rate of the two-dimensional images zoomed by the digital zoom section;
   parallax modifying section for modifying at least one of the digitally zoomed two-dimensional images based on an enlarged amount of parallax to provide an amount of parallax between the digitally zoomed two-dimensional images equal to the enlarged amount of parallax when the digital zoom rate obtained by the zoom rate obtaining section is larger than 100%, wherein the enlarged amount of parallax is obtained by enlarging, at a moderated digital zoom rate, an amount of parallax between the two-dimensional images before being digitally zoomed, the moderated digital zoom rate is obtained by moderating the digital zoom rate at a moderation rate, and the moderation rate increases as the zoom rate increases; and
   display control section for causing the display section to carry out three-dimensional display based on the modified two-dimensional images.

2. The three-dimensional display device as claimed in claim 1, wherein
   each of the two-dimensional images comprises a low-resolution image and a compressed high-resolution image,
   the digital zoom section digitally zooms the low-resolution images,
   the parallax modifying section applies the modification to at least one of the digitally zoomed low-resolution images,
   the three-dimensional display device further comprises decompressing section for decompressing the compressed high-resolution images, and
   the display control section causes the display section to carry out first three-dimensional display based on the modified low-resolution images, and then, in place of the first three-dimensional display, the display control section causes the display section to carry out second three-dimensional display based on the decompressed high-resolution images decompressed by the decompressing section, the decompressed high-resolution images being displayed correspondingly to a three-dimensional display range based on the modified low-resolution images.

3. The three-dimensional display device as claimed in claim 2, wherein
   the display section is capable of three-dimensional display based on the two-dimensional images and two-dimensional display of one of the two-dimensional images,
   when the two-dimensional display of one of the two-dimensional images is carried out, the display control section causes the display section to carry out first two-dimensional display of one of the digitally zoomed low-resolution images, and then, in place of the first two-dimensional display, the display control section causes the display section to carry out second two-dimensional display of corresponding one of the decompressed high-resolution images decompressed by the decompressing section, the high-resolution image being displayed correspondingly to a two-dimensional display range of the digitally zoomed low-resolution image, and
   the three-dimensional display device further comprises time setting section for setting a time period from the start of the first two-dimensional display of the digitally zoomed low-resolution image to the start of the second two-dimensional display of the decompressed high-resolution image shorter than a time period from the start of the first three-dimensional display based on the modified low-resolution images to the start of the second three-dimensional display based on the decompressed high-resolution images.

4. A digital zoom correction method to be carried out in a three-dimensional display device including display means for carrying out three-dimensional display based on two or more two-dimensional images having parallax therebetween, and digital zoom means for digitally zooming the two-dimensional images, the method comprising the steps of:
   obtaining a digital zoom rate of the two-dimensional images zoomed by the digital zoom means;
   modifying at least one of the digitally zoomed two-dimensional images based on an enlarged amount of parallax to provide an amount of parallax between the digitally zoomed two-dimensional images equal to the enlarged amount of parallax when the digital zoom rate is larger than 100%, wherein the enlarged amount of parallax is obtained by enlarging, at a moderated digital zoom rate, an amount of parallax between the two-dimensional images before being digitally zoomed, the moderated digital zoom rate is obtained by moderating the digital zoom rate at a moderation rate, and the moderation rate increases as the zoom rate increases; and causing the display means to carry out three-dimensional display based on the modified two-dimensional images.

5. The digital zoom correction method as claimed in claim 4, wherein each of the two-dimensional images comprises a low-resolution image and a compressed high-resolution image, the digital zoom means digitally zooms the low-resolution images, the modification of the parallax is applied to at least one of the digitally zoomed low-resolution images, the compressed high-resolution images are decompressed, and first three-dimensional display is carried out based on the low-resolution images with the amount of parallax therebetween modified, and then, in place of the first three-dimensional display, second three-dimensional display is carried out based on the decompressed high-resolution images, the decompressed high-resolution images being displayed correspondingly to a three-dimensional display range based on the modified low-resolution images.

6. The digital zoom correction method as claimed in claim 5, wherein the display means is capable of three-dimensional display based on the two-dimensional images and two-dimensional display of one of the two-dimensional images, when the two-dimensional display of one of the two-dimensional images is carried out, the display means is caused to carry out first two-dimensional display of one of the digitally zoomed low-resolution images, and then, in place of the first two-dimensional display, the display means is caused to carry out second two-dimensional display of corresponding one of the decompressed high-resolution images, the high-resolution image being displayed correspondingly to a two-dimensional display range of the digitally zoomed low-resolution image, and a time period from the start of the first two-dimensional display of the digitally zoomed low-resolution image to the start of the second two-dimensional display of the high-resolution image is set shorter than a time period from the start of the first three-dimensional display based on the modified low-resolution images to the start of the second three-dimensional display based on the high-resolution images.

\* \* \* \* \*

UNITED STATES PATENT AND TRADEMARK OFFICE
CERTIFICATE OF CORRECTION

Page 1 of 1

PATENT NO. : 8,441,524 B2
APPLICATION NO. : 12/768395
DATED : May 14, 2013
INVENTOR(S) : Koichi Yahagi It is certified that error appears in the above-identified patent and that said Letters Patent is hereby corrected as shown below:

Title Page, below Item (65) should read:

-- (30)  Foreign Application Priority Data

May 1, 2009 (JP)    2009-111710 --

Signed and Sealed this
Sixteenth Day of July, 2013

Teresa Stanek Rea
*Acting Director of the United States Patent and Trademark Office*